Patented Oct. 27, 1925.

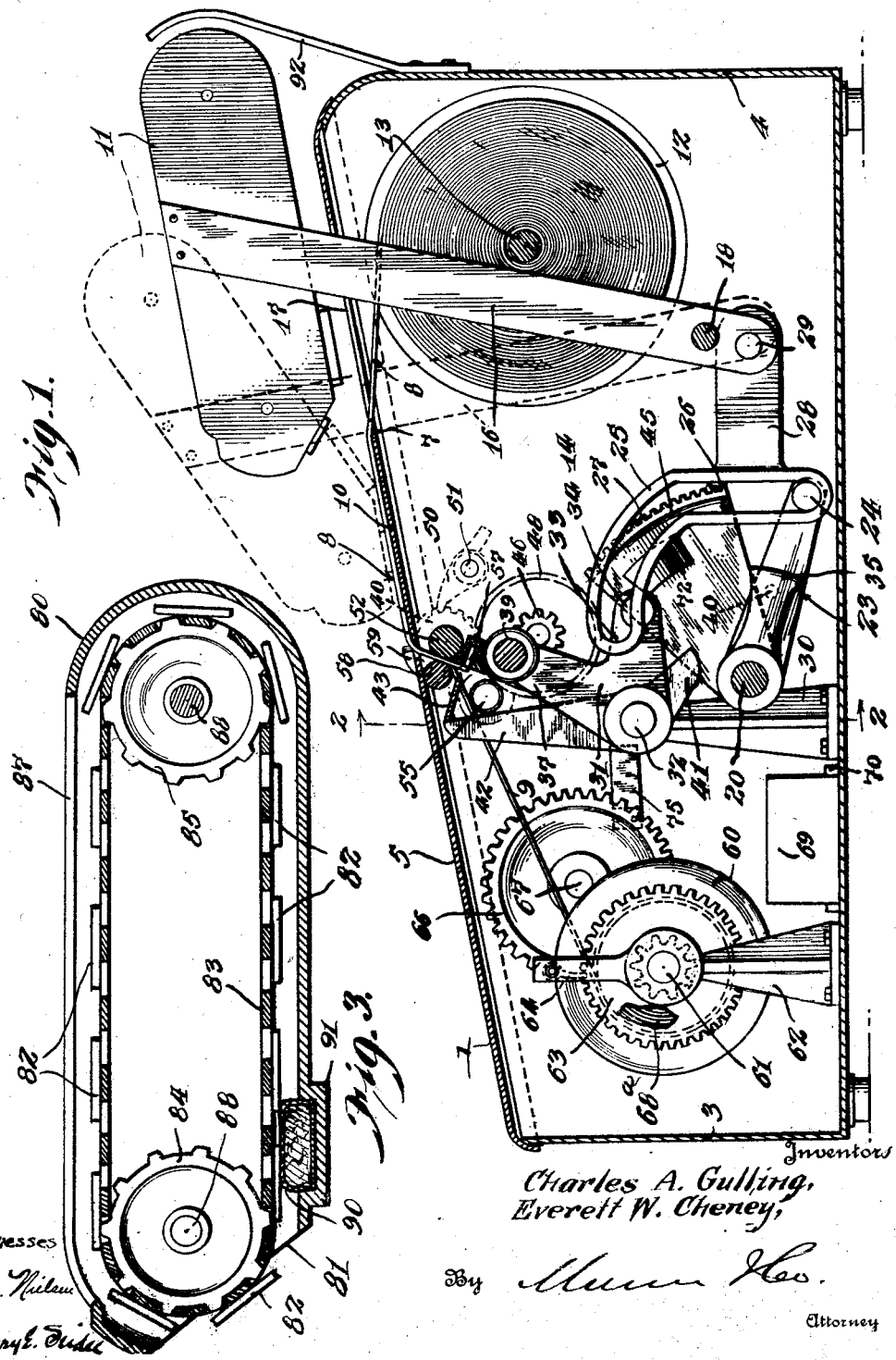

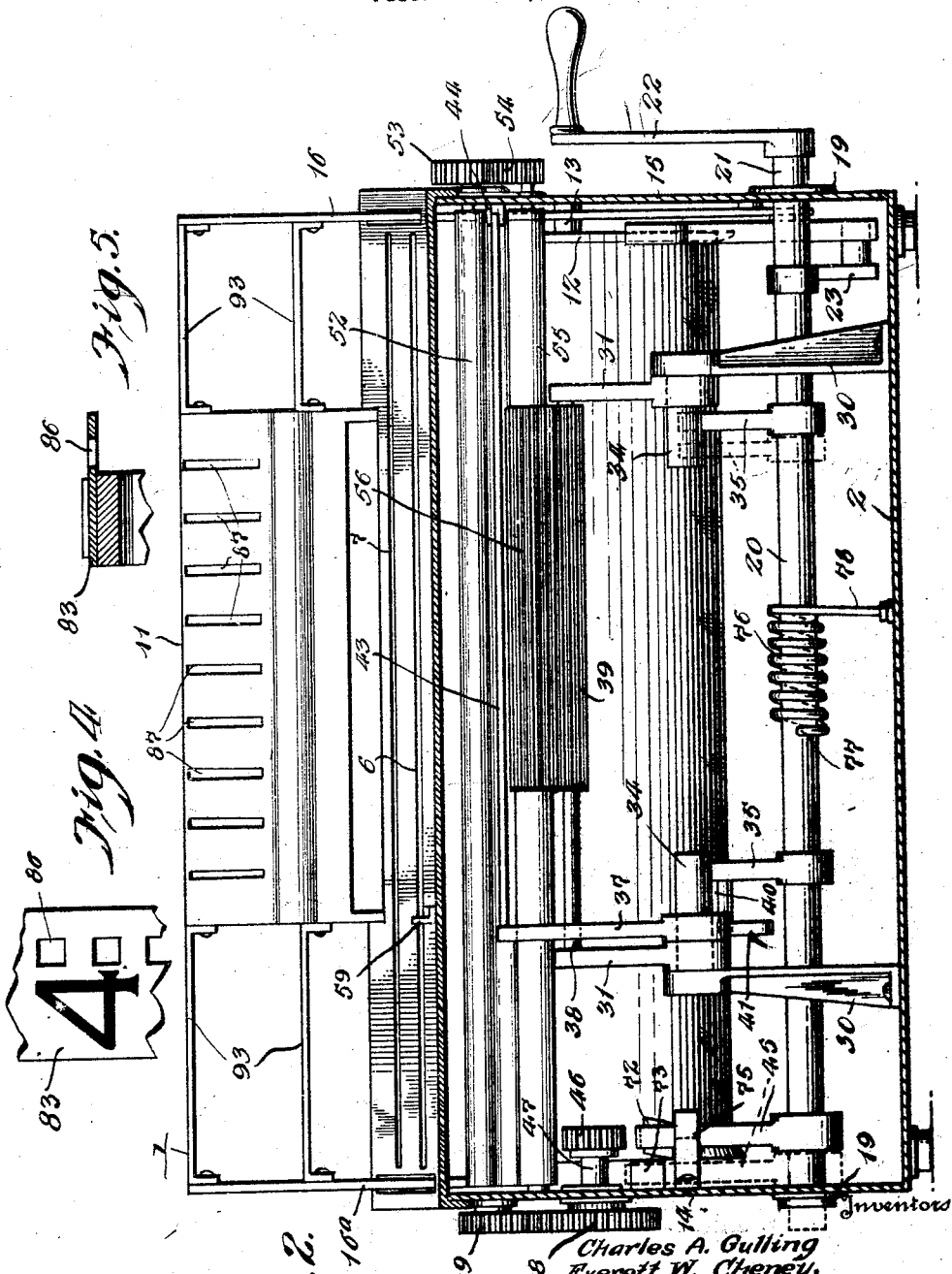

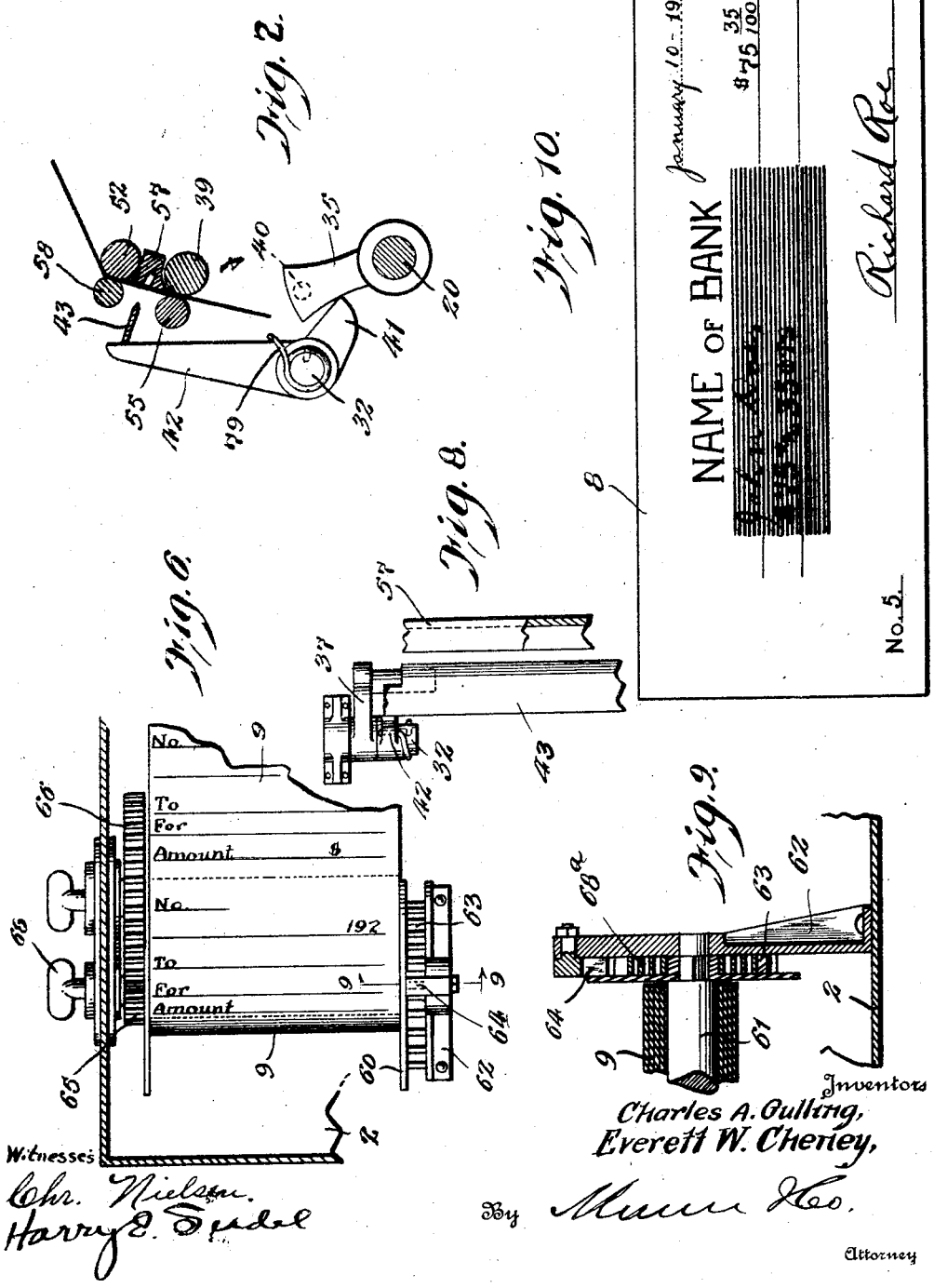

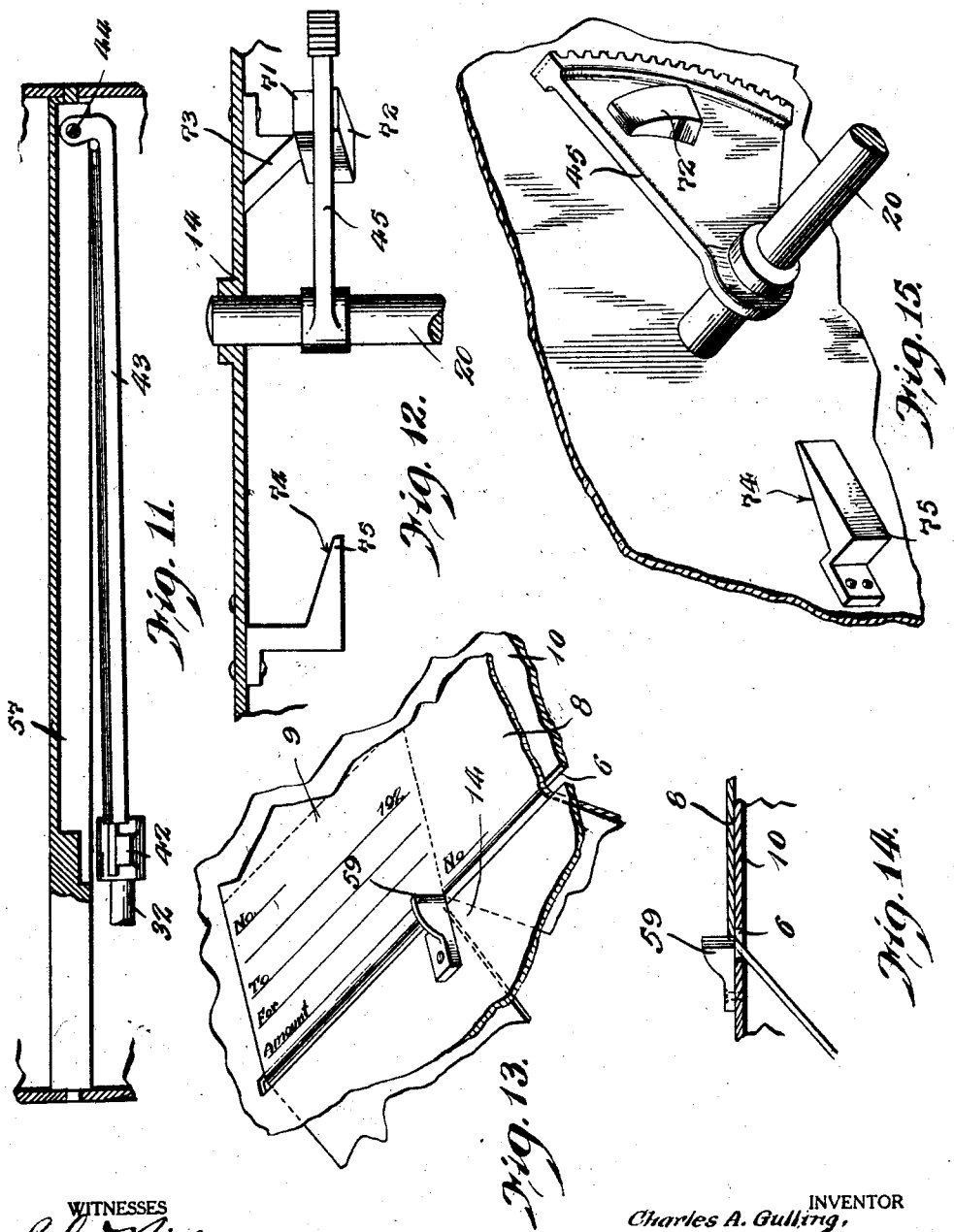

1,558,869

UNITED STATES PATENT OFFICE.

CHARLES A. GULLING AND EVERETT W. CHENEY, OF RENO, NEVADA.

CHECK PROTECTOR.

Application filed November 25, 1924. Serial No. 752,149.

*To all whom it may concern:*

Be it known that we, CHARLES A. GULLING and EVERETT W. CHENEY, citizens of the United States, and residents of Reno, in the county of Washoe and State of Nevada, have invented certain new and useful Improvements in Check Protectors, of which the following is a specification.

This invention relates to check protectors and has for its object the provision of a device which when operated will automatically move a type into printing relation with a check for printing the amount on said check, for mutilating the check at a point embracing the printing, cutting the printed and mutilated check, releasing the check from the strip of checks and from its respective stub and for rolling the stubs onto a spool after the same have been separated from the checks.

A further object of the invention is the provision of a device for printing the amount of the check upon its face, for mutilating the check to prevent unauthorized change in the amount and then cutting checks from the stubs and the preceding checks and a spring for returning the operating means for the printer, cutters and mutilating device without causing a receding movement of the checks.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a longitudinal sectional view of the check protector.

Figure 2 is a transverse vertical section of the check protector taken along the line 2—2 of Figure 1.

Figure 3 is a longitudinal vertical section of the printer.

Figure 4 is a fragmentary view in plan of a ribbon of the printer showing the type.

Figure 5 is a transverse vertical section of the type.

Figure 6 is a fragmentary view partly in section of the mechanism for rolling the stubs on a spool.

Figure 7 is a fragmentary section in detail showing the detaching means for the checks in conjunction with the movable means for said checks and the defacing rollers.

Figure 8 is a fragmentary side view of the operating means for the cutter.

Figure 9 is a fragmentary vertical section of the driving means for the spool carrying the stubs.

Figure 10 is a plan view of a check after having been printed and mutilated.

Figure 11 is a horizontal section showing the longitudinal cutter for the checks.

Figure 12 is a fragmentary vertical section of the means for causing longitudinal movement of the operating shaft of the check protector.

Figure 13 is a fragmentary view in plan showing the cutter for disengaging the checks from the stubs.

Figure 14 is a transverse vertical section taken along the dotted line which indicates the end of a stub.

Figure 15 is an enlarged detail view in perspective showing the cam arrangement for causing longitudinal movement of the operating shaft of the check protector.

Referring more particularly to the drawings, 1 designates a casing having a base 2, a front wall 3 and a rear wall 4 of greater height than the front wall and a top or closure 5 inclined at an angle to the horizontal. The top intermediate its end is provided with a pair of spaced slots 6 and 7 through which a strip of connected checks 8 and stubs 9 are adapted to be moved and in flat engagement with a portion 10 of the top which forms the press bed for the movable printer generally designated by the numeral 11. The checks and stubs are carried by a spool 12 which is loosely mounted on shaft 13 carried by bearings formed in the opposite side walls 14 and 15 of the casing 1.

The printer 11 is rigidly secured to the upper end of a pair of arms 16 which are movable through slots 17 in the top 5 and pivotally mounted on an axle 18 carried by bearings on the opposite sides 14 and 15 of the casing. Midway of the front and rear walls of the casing and rotatably mounted in bearings 19 on the side walls 14 and 15 is a shaft 20 which has one end 21 extended beyond the side wall 15 to which is connected a crank 22.

Adjacent the side wall 15 the lever 23 is secured to the shaft 20 and has a pin 24 projecting into a slot of a reciprocating yoke 25. The slot is provided with a vertical section 26 and an arcuately shaped section 27. Projecting rearwardly from the yoke 25 is an arm 28 provided with a pin 29 which pivotally connects the lower end of arm 16 with the reciprocating member 28.

A pair of spaced standards 30 are secured adjacent the shaft 20 to the bottom 2 of the casing 1. A pair of bell crank levers 31 are rotatably mounted on an axle 32 carried by the upper ends of the standards 30. Each of the lower arms 33 of the bell crank lever 31 carry a laterally projecting pin 34 adapted to be engaged respectively by a pair of cams 35 secured to the shaft 20. The upper arms 37 of said bell crank lever are connected together by an axle 38 upon which is rotatably mounted a defacing roller 39.

One of the cams 35 carries a laterally projecting pin 40 adapted to engage an arm 41 of a bell crank lever for oscillating the same. The upper arm 42 of the last mentioned bell crank lever carries one end of a knife blade 43, the other end being pivoted as shown at 44 on the side wall 15 of the casing 1.

To the shaft 20 and adjacent the side wall 14 is rigidly secured a segmental gear 45 which is adapted to mesh with a gear 46 on a shaft 47 having bearings in the side wall 14 and projecting beyond the same. A gear 48 is mounted upon the outwardly projecting portion of the shaft 47 and is adapted to mesh with a gear 49. A pawl 50 pivotally mounted upon the outer face of the wall 14 as shown at 51 is adapted to engage the gear 49 and prevent rotation of said gear in one direction.

A roller 52 is mounted in bearings in the side walls 14 and 15 of the casing and projects beyond the opposite end of the casing and carries the gear 49 whereby said roller is driven. A gear 53 secured to the projecting end of the roller 52 meshes with a gear 54 carried by the projecting end of a shaft 55. The shaft 55 intermediate its ends is provided with a defacing roller 56 cooperating with the roller 39 for mutilating check. Located between the roller 52 and the defacing roller 39 is a sheath 57 adapted to receive the knife 43 when the arms 42 are operated for cutting the check 8 from a preceding check. A roller 58 mounted in bearings in the side walls 14 and 15 of the casing is adapted to cooperate with the positively driven roller 52 for forcing the check 8 along its path through the device until severed by the knife blade 43.

A blade 59 has a vertical cutting edge disposed on the top 5 of the casing and in the path where the perforated line is located between the checks and stubs, so that as the series of connected stubs 9 are wound upon the spool 60 they are severed from the checks 8 as the checks pass through the elongated slot 6. The spool 60 is mounted on an axle 61 carried by spaced standards 62 adjacent the forked end of the casing. A gear 63 rigid with shaft 61 is adapted to be engaged by a resilient pawl 64 for maintaining the spool against rotation in one direction. A gear 65 on the other end of the shaft 61 and beyond the spool 60 meshes with a gear 66 mounted on a shaft 67 carried in bearings on the side wall 14 of the casing. An operating knob 68 rigid with shaft 67 is adapted to operate the gear 66 and drive gear 65 and rewinds the spring $68^a$ carried by the drum or spool 60.

A receptacle 69 is slidably mounted in a guide 70 on the base 2 of the casing. One of the side walls of the casing is provided with an opening through which the receptacle 69 is withdrawn for removing the checks.

The segmental gear 45 has on one face a cam member 71 and on its other face and oppositely located another cam member 72. The cam member 71 is adapted to engage the cooperating member 73 for forcing the segmental gear 45 inwardly and away from the side wall 14 of the casing while when the cam 72 engages the inclined face 74 of a cam member 75 the segmental gear 45 will be moved outwardly towards the wall 14 for moving the segmental gear back to its normal position; since said segmental gear is rigid with shaft 20 the shaft likewise will be moved longitudinally and thereby moving the cam member 35. It will be noted that the cam members 73 and 75 are mounted upon the wall 14 and in the path of the cams 71 and 72 of the segmental gear 45. A spring 76 coiled about the shaft 20 has one end as shown at 77 secured to said shaft and its other end as shown at 78 secured to the base 2 of the casing.

A spring 79 is shown embracing the pins 32 having one end secured to the pin with the other end engaging about the arm 42. The spring is adapted to return the arm 42 and the knife 43 to their normal inoperative position after the same has been released.

The printer 11 comprises a casing 80 having an opening 81 through which the type 82 are adapted to be projected which are carried by the endless chains or perforated bands 83. The bands are carried by the pair of spaced toothed wheels 84 and 85. It will be noted that the bands 83 are provided with a plurality of perforations 86 adapted to engage the teeth of the wheels 84 and 85 and also adapted to be engaged by an instrument inserted through slots 87 for moving the bands whereby the desired type 82 are placed in longitudinal alinement at the opening 81 in the casing 80. It will be noted that the wheels 84 are mounted respectively upon a spaced shaft 88 and each band carries a sufficient number of type to include the numerals one to nine and zero and such other indicia as the dollar mark or letters as may be required for printing the amount of the check upon the face of the same. Each individual band 83 is moved separately from the other bands in order to provide for the combination of figures and letters to show the amount of the check. The type as they are moved upon their wheels 84 and 85 will print across the face of an inked band 90 mounted in a pocket 91 formed at the bottom of the casing 80 so that when the type are moved into position before the opening 81 they will be in condition for printing.

A sheath 92 is secured to the rear wall 4 of the casing at its lower end and projects outwardly and upwardly and is curved to conform to the curvature of the rear end of the casing 80 and is adapted to act as a protection against accidental movement of the printer 11 and also is intended to act as a stop in case the printer is moved outwardly at too great an extent. Bars 93 are adapted to connect the arms 16 and 16ª with the sides of the casing 80.

The operation of our device is as follows:

The leading stub is connected to a tab (not shown) for connecting the same on the spool 60 so that it will not be necessary to move certain of the checks in order to begin winding of the stubs upon its respective spool. The foremost check is brought forward and caught between rollers 52 and 58. The crank 22 is operated, moving lever 23. As the pin 24 rides in the straight portion 26 of the slot of the yoke 25 the rod 28 is moved rearwardly, rocking the arms 16 and 16ª on the shaft 18 whereby the printer 11 is moved into the dotted line position shown in Figure 1 and the type prints the amount of the check upon the face of the same. As the pin moves beyond the central point of the straight slot 26 and towards the upper end of the same the rod 28 is moved forwardly thereby reversely rocking the arms 16 and 16ª and moving the printer 11 back to its normal inoperative position. While the pin 24 is moving upwardly in the slot 26 of the yoke 25 the cam member 35 moves the pin 34 upwardly rocking the bell crank lever 31 and causing the arms 37 to be moved inwardly, thereby moving the defacing roller 39 into engaging relation with the check and the other defacing roller 56. When the cam member 35 has been rocked through a certain angular position, pin 40 on said arm engages the arm 41 of a second bell crank lever rocking the same, moving the arm 42 inwardly so that the knife 43 is moved within the sheath 57, severing the printed check from the preceding check. The rocking of the segmental gear 45 causes the teeth of said gear to mesh with the gear 46 and likewise rotating gear 48 and gear 40 so that the roller 52 is revolved which, cooperating with the roller 58, draws the checks 7 from the spool 12.

The spring in the spool 60 is adapted to maintain the connected stubs 9 under tension and tending always to roll them on the spool so that as the checks are moved forwardly the spool will automatically wind the stubs thereon. The severed checks are deposited in the container 69 which may be removed from the casing 1 when desired. The pawl 50 will prevent the roller 52 from being reversed, nevertheless the pawl is adapted to be manually operated for releasing the gear 40 so that the stubs may be withdrawn from the spool 60 and inspected whenever desired. The withdrawal of the stubs through the slot 6 will cause the spring to wind and a release of the stubs will cause the spring to automatically rewind the stubs on said spool. As the handle 22 is moved towards its limit of movement the cam 71 will engage the cam 73 and move the shaft 20 longitudinally and likewise the segmental gear 45, cam 35 and lever 23 so that the pin 24 will be moved out of the slots 27 and 26 when the spring 76 is returning the shaft 20 to its normal inoperative position.

As the lever 23 and pin 24 approach their normal inoperative position the second cam member 72 engaging the inclined face 74 of the cam member 75 will cause the shaft 20 to be moved back longitudinally to its normal position and carry with it the segmental gear 45 and cams 35 so that the pin 24 will again be disposed within the lower end of the straight slot 26 of the yoke 24. Upon the return or reverse rotation of the shaft 20 and the gear 45 to their normal inoperative positions it will be seen that the segmental gear will be moved out of engagement with the gear 46 so that the segmental gear will not rotate the gear 46 and cause the gear 48 to drive gear 49 whereby the rollers will reversely move the check. It will be noted that the pins 34 which are engaged by the cams 35 are of sufficient length to permit the cams 35 to be shifted by the shaft 20 so that the cams will always be in a position to engage the pins and operate the same when desired.

It must be borne in mind that the angular relation between segmental gear 45, lever 23 and cam member 35 which are all mounted on the same shaft and operated simultaneously, is such that the stamp is moved to printing position while the check is stationary and then returned to an inoperative position. At the time that the stamp moves away from the check segmental gear begins meshing relation with gear 46 thereby rotating rollers 52 and 58 and causing transportation of the check. At a predetermined point in the travel of the check the cam member 35 transposes the defacing rollers into operative relation with the check for a sufficient period of time to mutilate a portion of its face.

What we claim is:

1. A check protector comprising means for carrying a roll of connected stubs and checks, a movable printer, means for causing the printer to move into printing relation with a check and back to normal inoperative position, means actuated to move the printed check, and means for defacing the printed portion of the check.

2. A check protector comprising means for carrying a roll of connected stubs and checks, a movable printer, means for causing the printer to move into printing relation with a check and back to normal inoperative position, means actuated to move the printed check, means for defacing the printed portion of the check, and means for severing the check from a connected stub.

3. A check protector comprising means for carrying a roll of connected stubs and checks, a movable printer, means for causing the printer to move into printing relation with a check and back to normal inoperative position, means actuated to move the printed check, and means for defacing the printed portion of the check while the printer is being returned to its normal inoperative position.

4. A check protector comprising means for carrying a roll of connected stubs and checks, a movable printer, means for causing the printer to move into printing relation with a check and back to normal inoperative position, means actuated to move the printed check, means for defacing the printed portion of the check, means for severing the check from a connected stub, and means for collecting the stubs after the checks have been cut therefrom.

5. A check protector comprising means for carrying a roll of connected stubs and checks, a movable printer, means for causing the printer to move into printing relation with a check and back to normal inoperative position, means actuated to move the printed check, means for defacing the printed portion of the check, means for severing the check from a connected stub and means for severing the check from the roll of checks, and means for returning the operating means for the defacing means and moving means for the check to their normal position.

6. A check protector comprising means for carrying a roll of connected stubs and checks, a movable printer, means for causing the printer to move into printing relation with the check and back to normal inoperative position, a pair of rollers adapted to be revolved for moving the printed check, means connected with the operating means for the printer for causing rotation of the rollers, and means actuated by the operating means for the printer for causing defacing of the printed portion of the check 7. A check protector comprising means for carrying a roll of connected stubs and checks, a movable printer, means for causing the printer to move into printing relation with a check and back to normal inoperative position, a shaft included in the actuating means for the printer, a segmental gear secured to said shaft, rollers adapted to move the check a predetermined distance, gears connected with the rollers and meshing with the segmental gear whereby said rollers are predeterminedly revolved, and means adapted to be moved into position and engaging the moving check for defacing the printed portion of said check.

8. A check protector comprising means for carrying a roll of connected stubs and checks, a movable printer, means for causing the printer to move into printing relation with a check and back to normal inoperative position, a shaft included in the actuating means for the printer, a segmental gear secured to said shaft, rollers adapted to move the check a predetermined distance, gears connected with the rollers and meshing with the segmental gear whereby said rollers are predeterminedly revolved, a pair of co-operating defacing rollers, one of said rollers being adapted to be moved into engagement with the moving check for defacing the printed portion of said check, and means connected with the shaft for moving the defacing rollers.

9. A check protector comprising means for carrying a roll of connected stubs and checks, a movable printer, means for causing the printer to move into printing relation with a check and back to normal inoperative position, a shaft included in the actuating means for the printer, a segmental gear secured to said shaft, rollers adapted to move the check a predetermined distance, gears connected with the rollers and meshing with the segmental gear whereby said rollers are predeterminedly revolved, a pair of cooperating defacing rollers, one of said rollers being adapted to be moved into engagement with the moving check for defacing the printed portion of said check, means connected with the shaft for moving the defacing rollers, and means connecting the defacing rollers with the segmental gear for causing rotation of said defacing rollers.

10. A check protector comprising means for carrying a roll of connected stubs and checks, a movable printer, means for causing the printer to move into printing relation with a check and back to normal inoperative position, a shaft included in the actuating means for the printer, a segmental gear secured to said shaft, rollers adapted to move the check a predetermined distance, gears connected with the rollers and meshing with the segmental gear whereby said rollers are predeterminedly revolved, a pair of cooperating defacing rollers, one of said rollers being adapted to be moved into engagement with the moving check for defacing the printed portion of said check, means connected with the shaft for moving the defacing rollers, and means for causing a reverse rotation of the shaft for returning the segmental gear and the operating means for the first mentioned rollers and the defacing rollers to normal inoperative position.

11. A check protector comprising means for carrying a roll of connected stubs and checks, a movable printer, means for causing the printer to move into printing relation with a check and back to normal inoperative position, a shaft included in the actuating means for the printer, a segmental gear secured to said shaft, rollers adapted to move the check a predetermined distance, gears connected with the rollers and meshing with the segmental gear whereby said rollers are predeterminedly revolved, a pair of cooperating defacing rollers, one of said rollers being adapted to be moved into engagement with the moving check for defacing the printed portion of said check, means connected with the shaft for moving the defacing rollers, means for causing a reverse rotation of the shaft for returning the segmental gear and the operating means for the first mentioned rollers and the defacing rollers to normal inoperative position, and means for causing the said operating means to be shifted whereby the movable printer, the first mentioned rollers and the defacing rollers will remain inoperative.

12. A check protector comprising means for carrying a roll of connected stubs and checks, a movable printer, means for causing the printer to move into printing relation with a check and back to normal inoperative position and comprising a shaft manually operated in one direction, a lever rigid with said shaft, the shaft being movable longitudinally, a reciprocating yoke provided with a slot, a pin connected to the lever and movable in the slot, arms connected with the printer and pivoted intermediate their ends, the free end of one of the arms being connected with the yoke whereby when the yoke is reciprocated the arms connected with the printer will be rocked for moving the printer to an operative position.

13. A check protector comprising means for carrying a roll of connected stubs and checks, a movable printer, means for causing the printer to move into printing relation with a check and back to normal inoperative position and comprising a shaft manually operated in one direction, a lever rigid with said shaft, the shaft being movable longitudinally, a reciprocating yoke provided with a slot, a pin connected to the lever and movable in the slot, arms connected with the printer and pivoted intermediate their ends, the free end of one of the arms being connected with the yoke whereby when the yoke is reciprocated the arms connected with the printer will be rocked for moving the printer to an operative position, the slot in the yoke composed of a straight portion and an arcuately shaped portion whereby when the pin moves through an arc of a circle in the straight portion of said slot the yoke will be reciprocated for moving the printer to an operative and then to an inoperative position, the pin being movable in the arcuately shaped portion of the slot whereby the printer will remain in an inoperative position.

14. A check protector comprising means for carrying a roll of connected stubs and checks, a movable printer, means for causing the printer to move into printing relation with a check and back to normal inoperative position and comprising a shaft manually operated in one direction, a lever rigid with said shaft, the shaft being movable longitudinally, a reciprocating yoke provided with a slot, a pin connected to the lever and movable in the slot, arms connected with the printer and pivoted intermediate their ends, the free end of one of the arms being connected with the yoke whereby when the yoke is reciprocated the arms connected with the printed will be rocked for moving the printer to an operative position, the slot in the yoke composed of a straight portion and an arcuately shaped portion whereby when the pin moves through an arc of a circle in the straight portion of said slot the yoke will be reciprocated for moving the printer to an operative and then to an inoperative position, the pin being movable in the arcuately shaped portion of the slot whereby the printer will remain in an inoperative position, a spring for reversely rotating the shaft, and means for causing the shaft to be shifted longitudinally upon reverse rotation for causing the pin to be moved out of the slot in the yoke to prevent reciprocation of said yoke and consequent movement of the printer.

15. A check protector comprising means for carrying a roll of connected stubs and checks, a movable printer, means for causing the printer to move into printing relation with the check and back to normal inoperative position, a shaft included in the actuating means for the printer, a pair of rollers for moving the check, a segmental gear secured to said shaft and operated thereby, intermeshing gears connected with the rollers for driving said rollers, a gear adapted to mesh with the segmental gear and connected with one of the intermeshing gears for causing actuation of the rollers, said segmental gear being adapted to be in meshing relation with the gear on the roller after the printer has been moved into printing relation with the check, defacing rollers adapted to mutilate the printed portion of the check and adapted to be placed into operative position with the check after the check has been printed, and means connected with the shaft and means operated by the last mentioned means for severing the printed and defaced check from the succeeding checks after the defacement operation.

CHARLES A. GULLING.
EVERETT W. CHENEY.